US012003048B2

(12) United States Patent
Mödinger et al.

(10) Patent No.: US 12,003,048 B2
(45) Date of Patent: Jun. 4, 2024

(54) PLUG CONNECTOR FOR FLEXIBLE CONDUCTOR FILMS

(71) Applicant: ERNI Production GmbH & Co. KG, Adelberg (DE)

(72) Inventors: Roland Mödinger, Weinstadt (DE); Fabian Kristmann, Ebersbach/Fils (DE)

(73) Assignee: ERNI Production GmbH & Co. KG, Adelberg (DE)

( * ) Notice: Subject to any disclaimer, the term of this patent is extended or adjusted under 35 U.S.C. 154(b) by 438 days.

(21) Appl. No.: 17/257,559

(22) PCT Filed: Jun. 18, 2019

(86) PCT No.: PCT/DE2019/100560
§ 371 (c)(1),
(2) Date: Dec. 31, 2020

(87) PCT Pub. No.: WO2020/007401
PCT Pub. Date: Jan. 9, 2020

(65) Prior Publication Data

US 2021/0344128 A1 Nov. 4, 2021

(30) Foreign Application Priority Data

Jul. 5, 2018 (DE) ......................... 102018116356.8

(51) Int. Cl.
*H01R 12/67* (2011.01)
*H01R 12/68* (2011.01)

(52) U.S. Cl.
CPC ........... *H01R 12/675* (2013.01); *H01R 12/68* (2013.01)

(58) Field of Classification Search
CPC ..... H01R 4/2433; H01R 12/68; H01R 12/675
See application file for complete search history.

(56) References Cited

U.S. PATENT DOCUMENTS 3,924,917 A 12/1975 Munshower
4,964,811 A 10/1990 Hayes et al.
(Continued)

FOREIGN PATENT DOCUMENTS

CA 2967079 A1 * 6/2016 ........... H01R 12/675
CN 101652902 A 2/2010
(Continued)

OTHER PUBLICATIONS

First Office Action issued in Chinese Patent Application No. 201980045253.1 dated Oct. 9, 2021, with English translation, 15 pages.

(Continued)

*Primary Examiner* — Jean F Duverne
(74) *Attorney, Agent, or Firm* — Weber Rosselli & Cannon LP

(57) ABSTRACT

A plug connector for flexible conductor films having film-insulated conductors, having a plug connector housing, in which at least one plug contact element is arranged, and having a coupling region, in which blades electrically conductively connected to the at least one plug contact element penetrate and fix at least one film-insulating conductor by producing an electrical contact, wherein the plug connector housing comprises two housing parts that can be fitted together, whose first housing part supports the blades and the at least one plug contact element electrically conductively connected to them, and whose second housing part receives and supports the flexible conductor film and has the at least one blade receiver adjusted to the blades, whose boundary surfaces are formed in such a way that at least one part of the blades is bent when fitting the two housing parts together in the direction of the film-insulated conductor, wherein at least one part of the blades is formed flexibly.

17 Claims, 9 Drawing Sheets

(56) References Cited

U.S. PATENT DOCUMENTS

| | | | |
|---|---|---|---|
| 5,122,079 | A | 6/1992 | Locati |
| 7,530,830 | B1 | 5/2009 | Lenox |

FOREIGN PATENT DOCUMENTS

| | | | | |
|---|---|---|---|---|
| CN | 202601898 | U | 12/2012 | |
| CN | 107112643 | A | 8/2017 | |
| CN | 107809010 | A | 3/2018 | |
| DE | 10352927 | A1 | 5/2004 | |
| DE | 102006017019 | A1 | 11/2006 | |
| DE | 102014118687 | | 6/2016 | |
| DE | 102015100401 | A1 * | 6/2016 | ........... H01R 12/675 |
| DE | 102015100401 | | 12/2016 | |
| FR | 2956780 | A1 | 8/2011 | |
| JP | 2002223513 | A | 8/2002 | |
| JP | 2003217722 | A | 7/2003 | |
| JP | 2018500730 | A | 1/2018 | |
| TW | M506404 | U | 8/2015 | |

OTHER PUBLICATIONS

Notice of Reasons for Refusal issued in Japanese Patent Application No. 2020-573197 dated Feb. 22, 2022 with English translation.

International Search Report issued in PCT/DE2019/100560 dated Oct. 17, 2019, with partial English translation, 7 pages.

* cited by examiner

PLUG CONNECTOR FOR FLEXIBLE CONDUCTOR FILMS

The invention relates to a plug connector for flexible conductor films having film-insulated conductors according to the type of claim 1.

PRIOR ART

Today, flexible conductor films having film-insulated conductors are used in used in all manner of fields of communication and consumer electronic systems, but also in vehicle construction. Conductor films can be used, in particular, where a very flexible conductor structure is desired with as small a weight as possible and limited space conditions. Flexible conductor films enable an ordered parallel guide of a plurality of separate conductor tracks, wherein larger bends are also possible and thus parts are electrically conductively connected to one another, which are arranged in an only very limited construction space. In particular in vehicle construction, such conductor films must also be able to withstand greater mechanical influences, such as vibrations, for example.

Here, the contacting of the individual film-insulated conductors has particular significance. Particularly in vehicle construction, this contacting must be designed to be secure and be able to withstand external mechanical influences but also temperature influences and environmental influences of many different kinds.

DE 10 2006 017 019 A1 discloses a plug for the contacting of a flexible printed circuit (FPC). The plug has plug contacting elements, which are electrically conductively connected to blades which penetrate and fix the conductor of the flexible printed circuit. The plug connector housing has two housing parts that can be fitted together, wherein one housing part supports the blades and the at least one plug contact element electrically conductively connected to them. Here, the flexible printed circuit must be positioned and held on one of the two housing parts while the second housing part is mounted. When mounting, the position of the three parts must thus be coordinated in relation to one another. Such a mounting is very laborious, in particular with regards to an automated production, and is thus problematic.

The contacting of a flexible conductor film having film-insulated conductors emerges from FR 2 956 780 in which the individual film-insulated conductors are pierced by blade-like points, and, after they have pierced the conductor tracks, these points are bent in such a way that they clamp and hold the flexible conductor film while simultaneously contacting the corresponding conductor tracks. This takes place with the aid of crimping technology. The blades are, in turn, electrically conductively connected to plug connectors, wherein one plug connector is allocated to each film-insulated conductor, said plug connector being contacted via several blades. After contacting the film-insulated conductors, which is also possible continuously automatically, the plug connectors contacted in this way must be mounted in plug connector housings, which requires additional mounting steps independent of the contacting. In doing so, the mounting of such plug connectors becomes laborious, which is disadvantageous with regards to an automated mounting.

A plug connection for flexible conductor films having film-insulated conductors emerges from DE 199 53 646 B4, having a plug and a counter plug, which are each provided on a conductor film end region and can be plugged into each other for the purposes of an electrical contacting of the film-insulated conductors. To do so, the plug and the counter plug each have a base body and a cover, which can be brought into contact with the base body via a fixing mechanism. In each case, at least one penetration contact element is provided between the base body and the cover, said penetration contact element providing a base plate made of electrically conductive material having penetration bodies. The penetration bodies are triangular moulded bodies formed from the base plate material, each having a triangular point rising up out of the base plate and a triangular base opposite the triangular point in the base plate, around which triangular base each moulded body is bent. A plurality of penetration bodies is provided in the base plate, whose triangular bases each form an angle with the longitudinal axis of the base plate in such a way that the penetration bodies are arranged one behind the other respectively alternately with respect to the longitudinal axis of the base plate at an angle of ±60°. A film-insulated conductor of the conductor film end region can be arranged on the penetration contact element before bringing the cover into contact with the base body, wherein the penetration contact element at least partially penetrates the film-insulated conductor for the purpose of fixing the electrical contacting by means of respectively pressing the cover against the base body. Also with this plug connection, several independent mounting steps are required, on the one hand for contacting the individual film-insulated conductors of the flexible conductor film and, on the other hand, for contacting the film-insulated conductors connected to plug connectors in this way in a plug connector housing.

Here, an automatic production is also not readily possible.

A generic plug connector for flexible conductor films having film-insulated conductors emerges from DE 10 2015 100 401 A1, which is available for an automatic production. This plug connector has a plug connector housing, in which at least one plug contact element is arranged, and having a coupling region, in which blades that are electrically conductively connected to the at least one plug contact element can penetrate and fix at least one film-insulated conductor by producing an electrical contact, wherein the plug connector housing comprises two housing parts that can be fitted together, whose first housing part supports the blades and the at least one plug contact element electrically conductively connected to them and whose second housing part receives and supports the flexible conductor film and has the at least one blade recess adjusted to the blades, the boundary surfaces of which blade receiver being formed in such a way that at least one part of the blades is bent in the direction of the film-insulated conductors during fitting together of the two housing parts. The blades are formed to be rigid and massive. The plug connector was developed for films in which the conductor is produced from a rolled copper with thicknesses from 50 to 200 μm. These copper conductors are relatively hard and stable because of the cold deformation.

Yet in the meantime, there are also film techniques in which conductor plates are photo-chemically structured, wherein the copper is galvanically deposited for the conductor tracks. This copper is relatively soft because of the galvanic deposition. The thicknesses of the conductor tracks or layers are here only moved in the range from 12 to 70 μm. With this technique, two-layer systems can also be produced. Thus, it is possible to form both conductor tracks and shielding layers.

If a plug connector emerging from DE 10 2015 100 401 A1 is used for contacting such flexible conductor films, purely in principle, it can lead to damages to the very thin conductor tracks, which, in extreme cases, even cause a conductor track interruption.

DISCLOSURE OF THE INVENTION

Advantages of the Invention

The plug connector according to the invention for flexible conductor tracks having the features of claim 1, by way of contrast, has the advantage that flexible conductor tracks having very thin film-insulated conductors, which have been produced as part of the galvanic deposition, can be contacted automatically, quickly and safely. To do so, it is provided that at least one part of the blades is formed flexibly. As a result of this flexible formation, a cutting process destroying the film-insulated conductor is effectively avoided. Extensive tests by the applicant have shown this.

Here, "flexible" blades means that the blades can yield marginally when they penetrate the film-insulated conductors.

Here, the flexibility is adjusted to the thickness of the film-insulated conductors. The thinner the film-insulated conductors are, the more flexible the blades are formed to be.

This plug connector for flexible conductor tracks not only enables a simple contacting that is, in particular, available in automatic production, of the film-insulated conductor tracks, in particular also a simultaneous contacting of several film-insulated conductor tracks arranged one alongside the other in the flexible conductor film when simultaneously mounting the plug connectors in the plug connector housing, but, in particular, also enables a very effective, electrically excellent and gas-tight contacting of the corresponding plug contacts, which also withstands mechanical loads and can thus also be used in vehicle construction, for example.

This excellent gas-tight contacting is achieved by bending the blades in the direction of the film-insulated conductors. By bending the blades, a pressure is exerted on the contact surface, and the electrical contact surface is enlarged. In doing so, a gas-tight contacting is achieved. At the same time, the blades are held under a certain tension in the plug connector housing. Here, the production of the electrical contacts by means of the blades electrically conductively connected to the plug connector takes place in a very advantageous manner simultaneously to the mounting of the plug connector housing by means of fitting the two plug connector housing parts one into the other.

As a result of the measures carried out in the dependent claims, advantageous developments and improvements of the plug connector specified in the independent claim are possible.

Purely in principle, the flexible blades can be formed in the most varied manner. A very advantageous aspect provides that the flexible formation is achieved in that the blades each have a hollow space, which enables an elastic deformation, for example pressing together, of the blade edges.

In turn, this hollow space can be formed in the most varied manner. It is particularly advantageous when the hollow space has a contour adjusted to the blade shape. In this case, the hollow space follows the blade edge, as it were, such that the blade edges substantially have the shape of a web. The larger the hollow space is, the thinner the web is and the better the blade edge can be deformed, in other words the greater is the flexibility.

It is more preferably provided that the flexibly formed blade edges are each arranged between the blades, which are bent when fitting the two housing parts together in the direction of the film-insulated conductors.

According to one aspect of the invention, it is provided that the second housing part has a receiving space adjusted to the conductor film, said receiving space having an opening for receiving the conductor film in at least one housing wall. In this way, the flat flexible conductor film can be inserted into the second housing part, and it is held there in the receiving space adjusted to it. Here, the opening and the receiving space are arranged in the second housing part in such a way that a conductor film arranged in the receiving space comes to rest substantially perpendicularly to the blades. This enables a mounting pre-positioning of the flexible conductor film in the second housing part by inserting the flexible conductor film into the second housing part, since the flexible conductor film is thus already arranged in the second housing part in the starting position, which enables an immediate and also automated contacting of the film-insulated conductor.

It is advantageously provided that the blade receivers have curved boundary surfaces.

Moreover, these boundary surfaces are preferably formed as gliding surfaces for at least one part of the blades.

Here, it is very advantageously provided that the boundary surfaces, which form the gliding surfaces, run in a funnel-like manner in such a way that two blades are bent in relation to one another, while they glide along on the boundary surfaces. This formation of the blade receivers adjusted to the blades enables the optimum gas-tight contacting of the film-insulated conductors with the at least one plug contact when mounting the second plug connector housing part on the first plug connector housing part.

In particular, this mounting can also take place automatically.

Here, according to an advantageous aspect of the invention, it is provided that the blades are arranged one behind another along a line in such a way that the film-insulated conductor is cut through at several points when mounting the second plug connector housing part on the first plug connector housing part.

Here, a very advantageous embodiment provides that the blades have different lengths, wherein in each case one shorter flexible blade is surrounded by two longer blades respectively, which are spaced apart from each other in such a way and whose length is so great that they come into abutment on the boundary surfaces of each blade receiver.

Purely in principle, such a blade receiver having three blades, one shorter and two longer, would suffice in order to achieve a good and secure and, in particular, gas-tight contacting of the film-insulating conductor with the plug contact. However, a particularly advantageous embodiment provides that the second housing part has several blade receivers arranged one behind the other in the longitudinal direction of the film-insulated conductor. In this way, the contact surface and thus the contact safety is increased. Moreover, in this way the flow capability of the contact produced in this way is also increased. With a planar extension of the film-insulated conductors, the blades lying one behind the other can also be arranged slightly offset to one another perpendicularly to the conductor track direction.

To form a strain relief of the flexible conductor film in the mounted state in the plug connector, clamping elements are provided in the first and/or second housing part, which clamp the flexible conductor film in the mounted state of the two housing parts to one another in the region between the film-insulated conductors.

Purely in principle, these clamping elements can be formed in the most varied manner and be arranged in the housing parts.

An advantageous embodiment provides that the clamping elements are each arranged between conductor tracks of the flexible conductor film.

Here, it can be provided that the clamping elements are each allocated to rows of blades.

A very advantageous embodiment of the invention provides that first clamping elements are arranged in the first housing part and second clamping elements interacting with the first clamping elements are arranged in the second housing part. In this way, a clamping of the flexible conductor film is produced automatically, to a certain extent, during the mounting of the second on the first housing part.

The formation of the first and second clamping elements can here be formed very differently. An advantageous embodiment provides that the first clamping elements are clamping teeth having rounded clamping tooth surfaces and that the second clamping elements are openings adjusted to the clamping teeth arranged in the second housing element. As a result of such a formation of the clamping elements, a particularly effective clamping that is easy to produce and thus strain relief of the flexible conductor film can be achieved in the plug connector housing part.

Here, it is advantageously provided that the clamping teeth have a height in such a way that, in the mounted state of the two housing parts one on the other, the flexible conductor film that can be arranged between the first and the second housing part can be deformed in such a way that the deformed flexible conductor film protrudes slightly into the openings arranged in the second housing part in the region of the openings.

A very advantageous embodiment further provides that the second housing part can be latched with the first housing part.

BRIEF DESCRIPTION OF THE DRAWINGS

Exemplary embodiments of the invention are depicted in the drawings and explained in more detail in the description below. Here are shown.

EMBODIMENTS OF THE INVENTION

Figure 1:
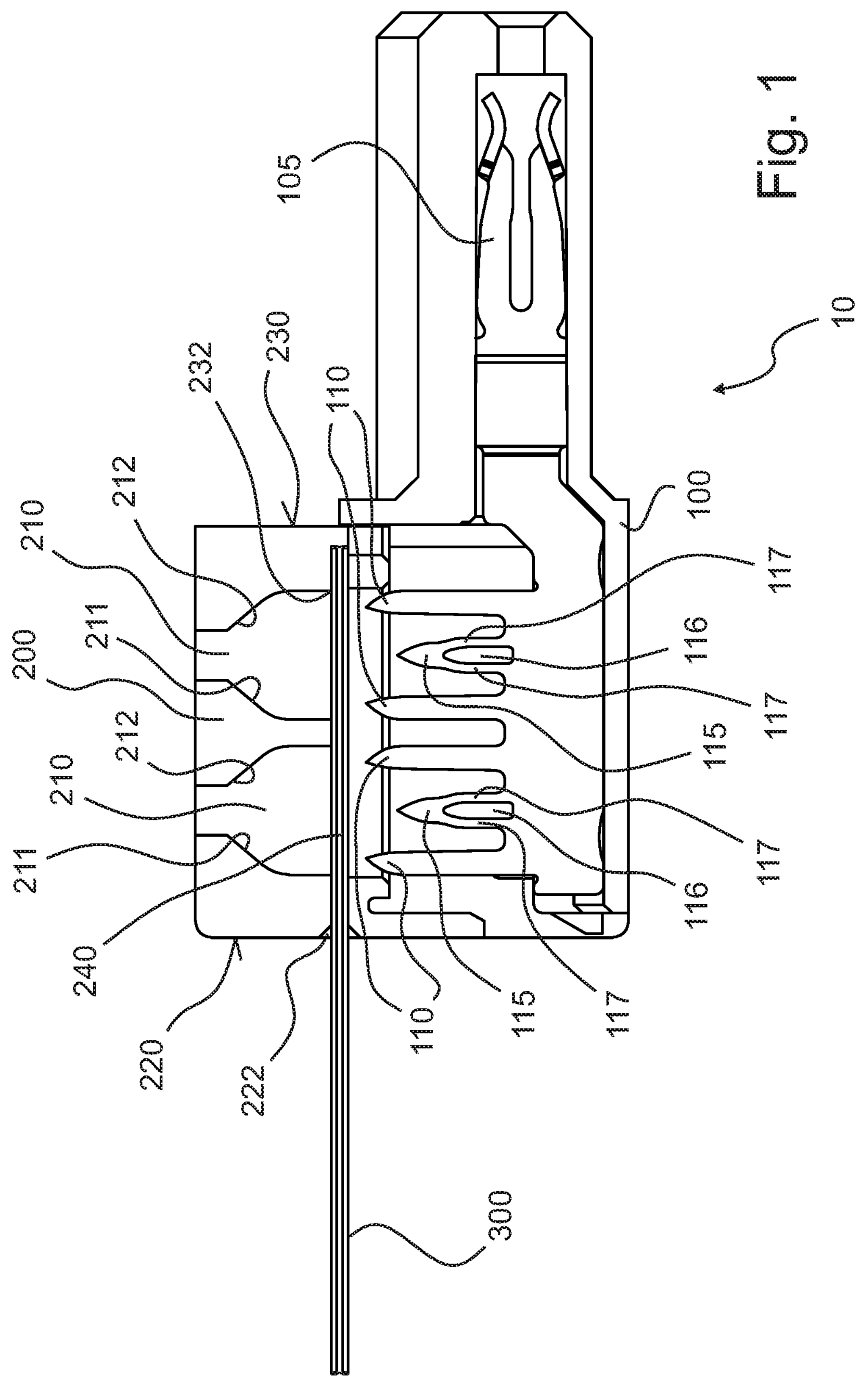
FIG. 1 a schematic sectional depiction of a plug connector according to the invention for flexible conductor films before mounting the two housing parts.

A plug connector labelled as a whole with 10 has a housing, which consists of two parts. In a first plug connector housing part 100, plug contacts are arranged in the shape of spring contacts 105 in an inherently known manner. Blades 110, 115 are electrically conductively connected to the plug contacts 105, said blades 110, 115 being arranged one behind the other in a line, wherein in each case one shorter blade 115 is surrounded by respectively two longer blades 110. The shorter blades 115 have an opening 116, through which a flexibility of the blades 115 is achieved, which will be explained in more detail below.

A second plug connector housing part 200 is formed as a separate part. The second plug connector housing part 200 is formed in such a way that, by inserting into a corresponding opening in the first plug connector housing part 100, it can be fixed on this and latched with this. The second plug connector housing part 200 has an opening 222 on a side wall 220, said opening serving to receive a flexible conductor film 300. An opening 232 is also arranged in the opposite side wall 230, said opening being accessible from the inside of the second plug connector, more exactly from a receiving space 240 arranged inside and adjusted to the conductor film 300. Both openings 222, 232 thus end in the receiving space 240 arranged in the second plug connector housing part and adjusted to the conductor film 300, the size of which receiving space corresponds substantially to the outer dimensions of the conductor film. As can be seen in FIG. 1, in particular, the opening 222 accessible from the outside is introduced into the conductor film, formed in the shape of a funnel in such a way that the introduction of the conductor film 300 into the second plug connector housing part 200 is made easier.

Figure 2:
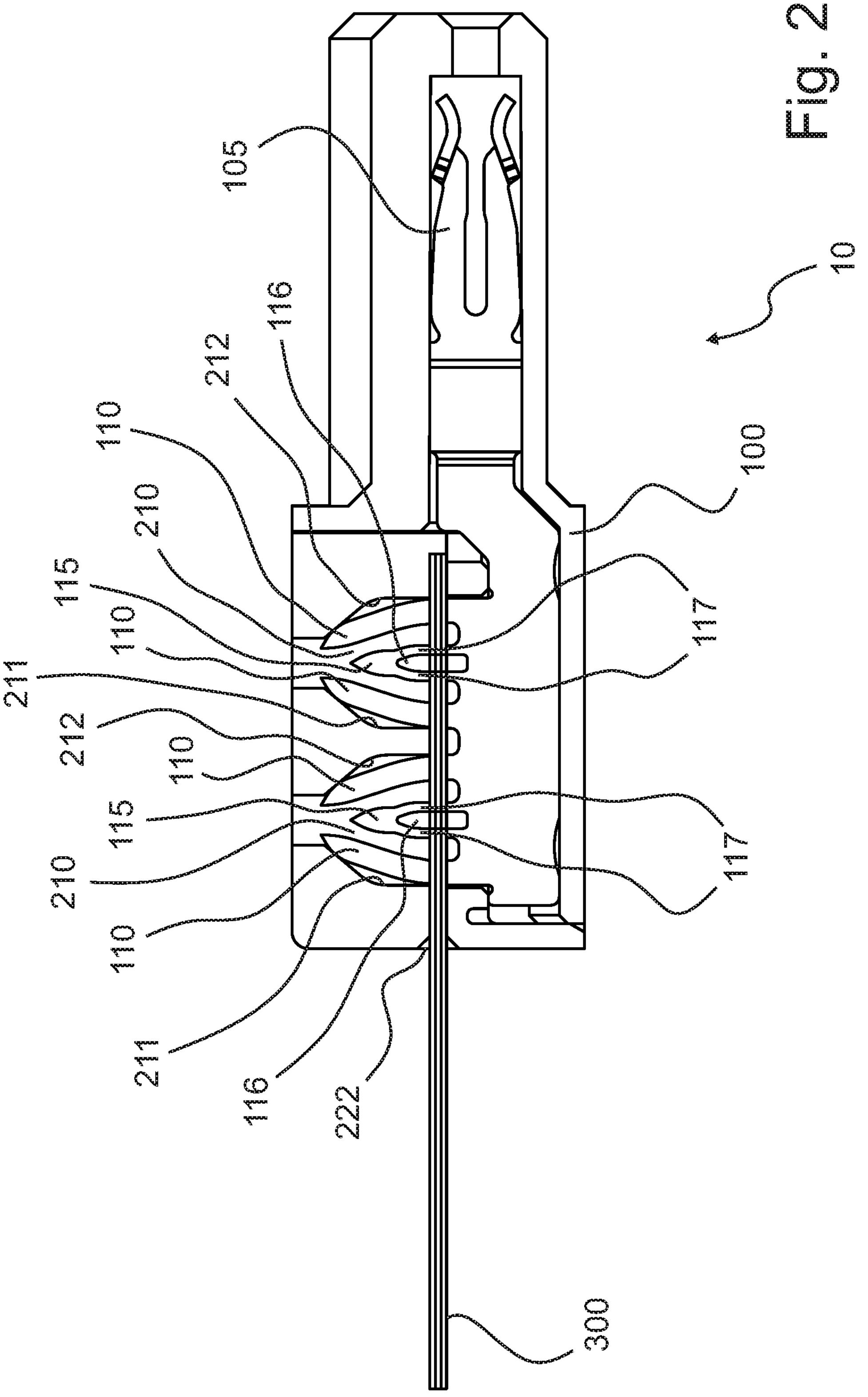
FIG. 2 the sectional depiction depicted in FIG. 1 of a plug connector according to the invention after mounting the two housing parts.

Moreover, in the second plug connector housing part 200, two blade receivers 210 are provided, which can also be referred to as blade receiving spaces. These blade receivers 210 have boundary surfaces 211, 212 curved in the shape of a funnel, which are spaced apart from one another in such a way that they are adjusted to the spacing of the two longer blades 110, which surround the shorter blade 115. The two longer blades 110, which respectively surround the shorter blade 115, thus “fit”, to some extent, into the blade receiver 210, wherein the longer blades 110 come into abutment with the boundary surfaces 211 or 212. The state before the final mounting of the second plug connector housing part 200 on the first plug connector housing part 100 is depicted in FIG. 1. The mounting now takes place by the second plug connector housing part 200 being pressed in the direction of the first plug connector housing part 100. Here, the blades 110, 115 cut through a film-insulated conductor track of the conductor film and thus contact the conductor film with the plug contact 105. When fitting together, the two outer longer blades 110 surrounding the shorter blades 115 glide on the two boundary surfaces 211, 212 of the blade receivers 210, wherein they are bent in relation to one another, as is depicted in FIG. 2. In the eventually mounted state, in which the second plug connector housing part 200 is locked on the first plug connector housing part 100, the outer blades 110 surrounding the shorter inner blade 115 are bent in relation to each other. Because of this bending, the two outer blades 110 cut in the direction of the conductor film and thus enlarge not only the contact surface, and thus increase the contact safety and also the flow capability, but they are subjected to pretension. In doing so, a pressure is exerted on the contact surfaces and this, in turn, enables a gas-tight contacting. This kind of contacting thus enables an electrical contacting that is resistant to external influences, in particular mechanical loads and that—and this is to be highlighted in particular—can also take place automatically. The shorter inner blades 115 each have a hollow space 116, which enables the blade edges to be pressed together. This hollow space 116 is substantially adjusted to the contour of the blades, such that the blade walls 117 substantially have a thickness that forms equally. As a result of these hollow spaces 116, a flexible formation of the blades 115 is achieved. Here, flexible means that the blades 115 elastically yield under pressure, i.e. can be pressed in the direction of the inside of the hollow space 116. As a result of this flexibility or malleability of the blades 115, in particular with very thin film conductors, which are generated by galvanic deposition of copper and have thicknesses of the conductor tracks or layers ranging from 12 to 70 micrometres, optimum contacting results can be obtained. With this technique, the contacting of two-layer systems is also possible, wherein the layers can be formed as conductor track or shielding layers. As a result of the elastic blades 115, with very thin copper films, a substantially better contacting is obtained than with non-flexible blades.

Figure 3:
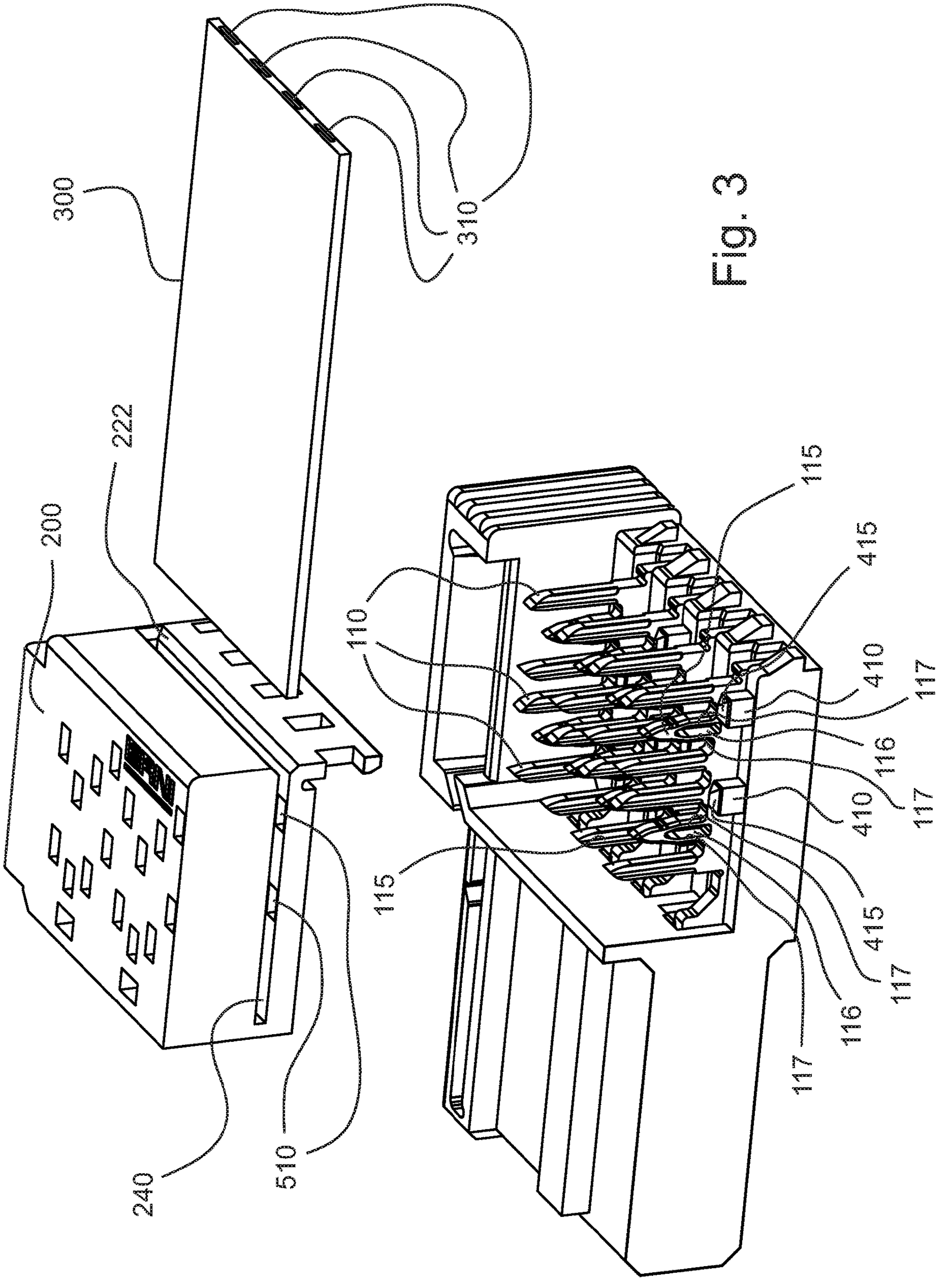
FIG. 3 to FIG. 8, in isometric, partially broken-away depiction, successive steps of the mounting of a flexible conductor film in a plug connector being used by the invention and partially sectional enlargements and FIG. 9, in isometric depiction, the complete plug connector depicted in FIG. 3 to 7.
Figure 9:
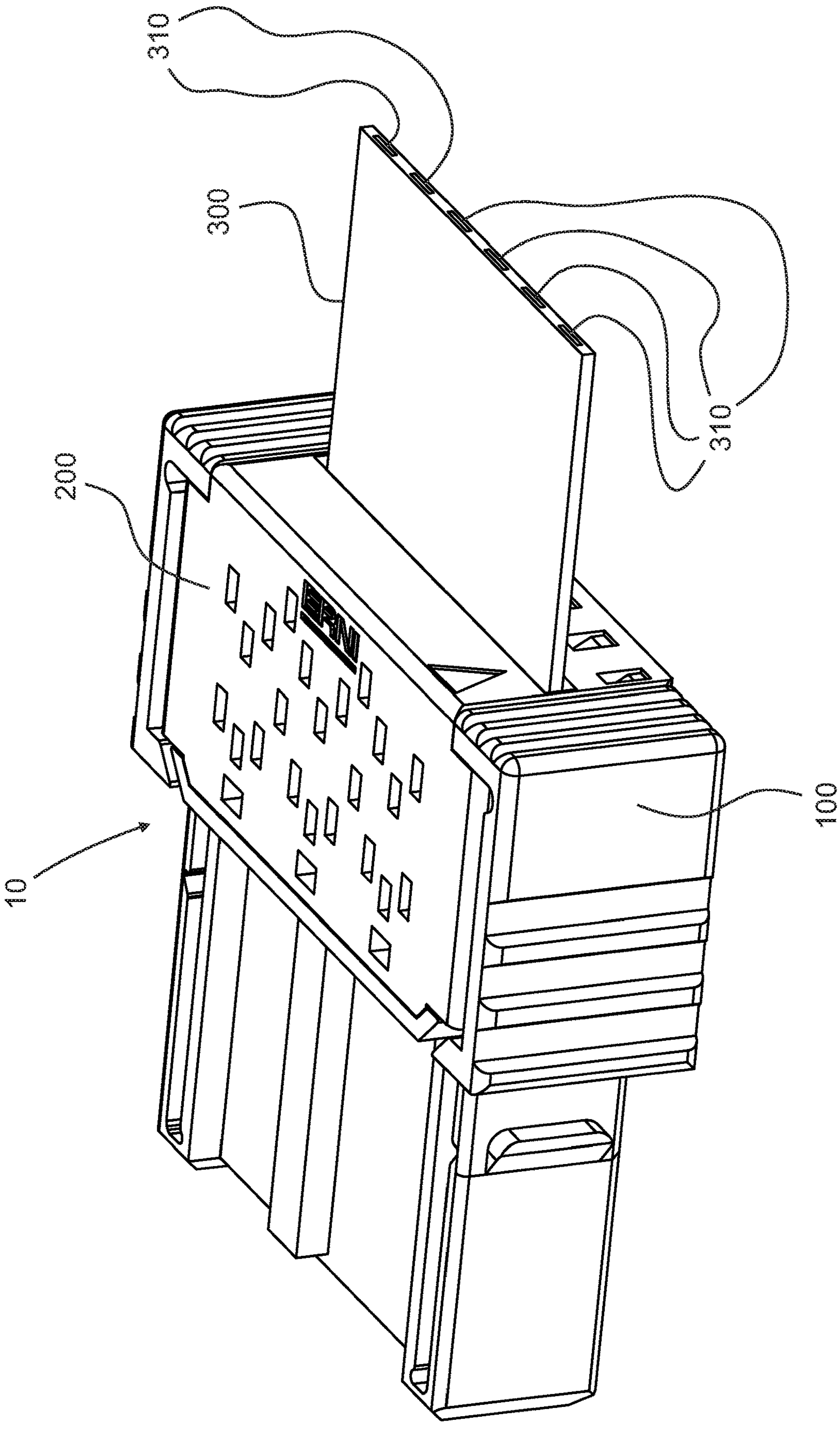

In FIG. 3, 4, 5, 7, different steps of the mounting of the flexible conductor film 300 are shown in an isometric and partially broken away depiction. FIG. 9 shows the flexible conductor film 300 in a completely mounted plug connector, i.e. after the fixing of the housing part 200 on the housing part 100 by forming the electrical contacting of film-insulated conductors 310 of the conductor film 300 and fixing the conductor film 300 in the manner described above.

To achieve a strain relief and a secure fixing of the flexible conductor film 300 in the plug connector housing, formed from the first housing part 100 and the second housing part 200 fastened on this, fastening elements are provided in the first housing part in the form of clamping teeth 410, which have rounded clamping teeth surfaces 415. These clamping teeth 410 are each positioned in the intermediary spaces between the film-insulated conductors 310 in order to clamp the flexible conductor films 300 there. As can be seen in FIG. 3, the film-insulated conductors 310 are arranged one next to the other in the flexible conductor film 300. In each case, blades 110, 115 are allocated to each film-insulated conductor 310 in order to contact and to clamp the film-insulated conductors 310. Here, in each case, clamping teeth 410 are allocated to each row of blades 110, 115. The clamping teeth 410 thus lie between the blades 110, 115, for example in the region of the flexible conductor film 300, in which no film-insulated conductor 310 is arranged. In FIG. 3, in each case four rows of blades 110, 115 and rows of clamping teeth are depicted, which are also arranged one behind the other and run substantially in parallel to the rows of the blades 110, 115.

Openings 510 respectively allocated to the clamping teeth 410 are arranged in the second housing part 200, said openings being adjusted to the clamping teeth 410 in such a way that the clamping teeth can be received by these openings 510.

Figure 4:
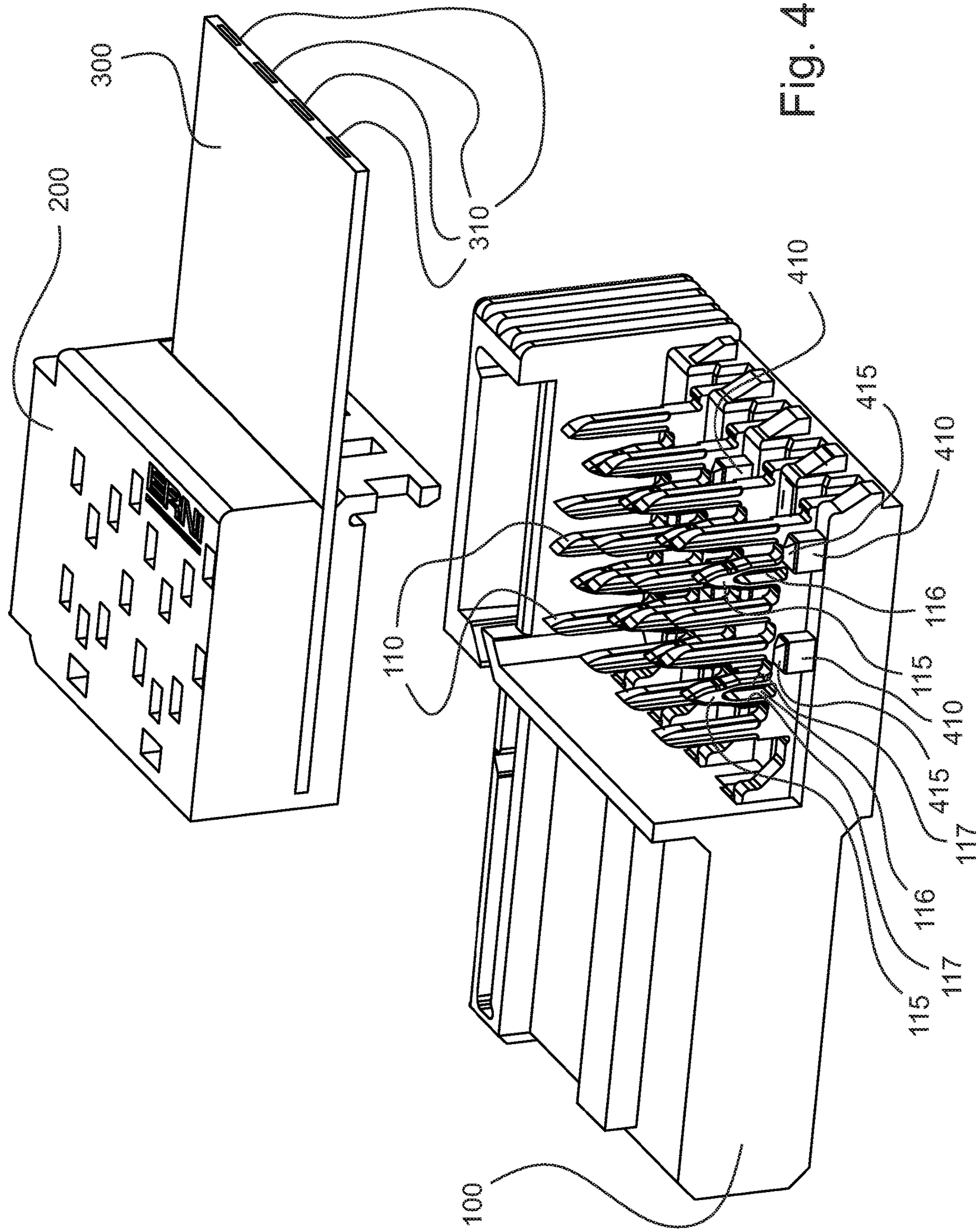

Firstly, the conductor film 300 is mounted in the second housing part 200 by it being introduced in the receiving space 240 in the manner described above. This is schematically depicted in FIG. 4.

Then, the second housing part 200 is moved in the direction of the first housing part 100. Here, the electrical contacting is produced in the manner described above by the blades 110, 115 penetrating the film-insulated conductor tracks 310 and then being bent in the direction of the film-insulated conductors 310, i.e. in the conductor direction.

Figure 5:
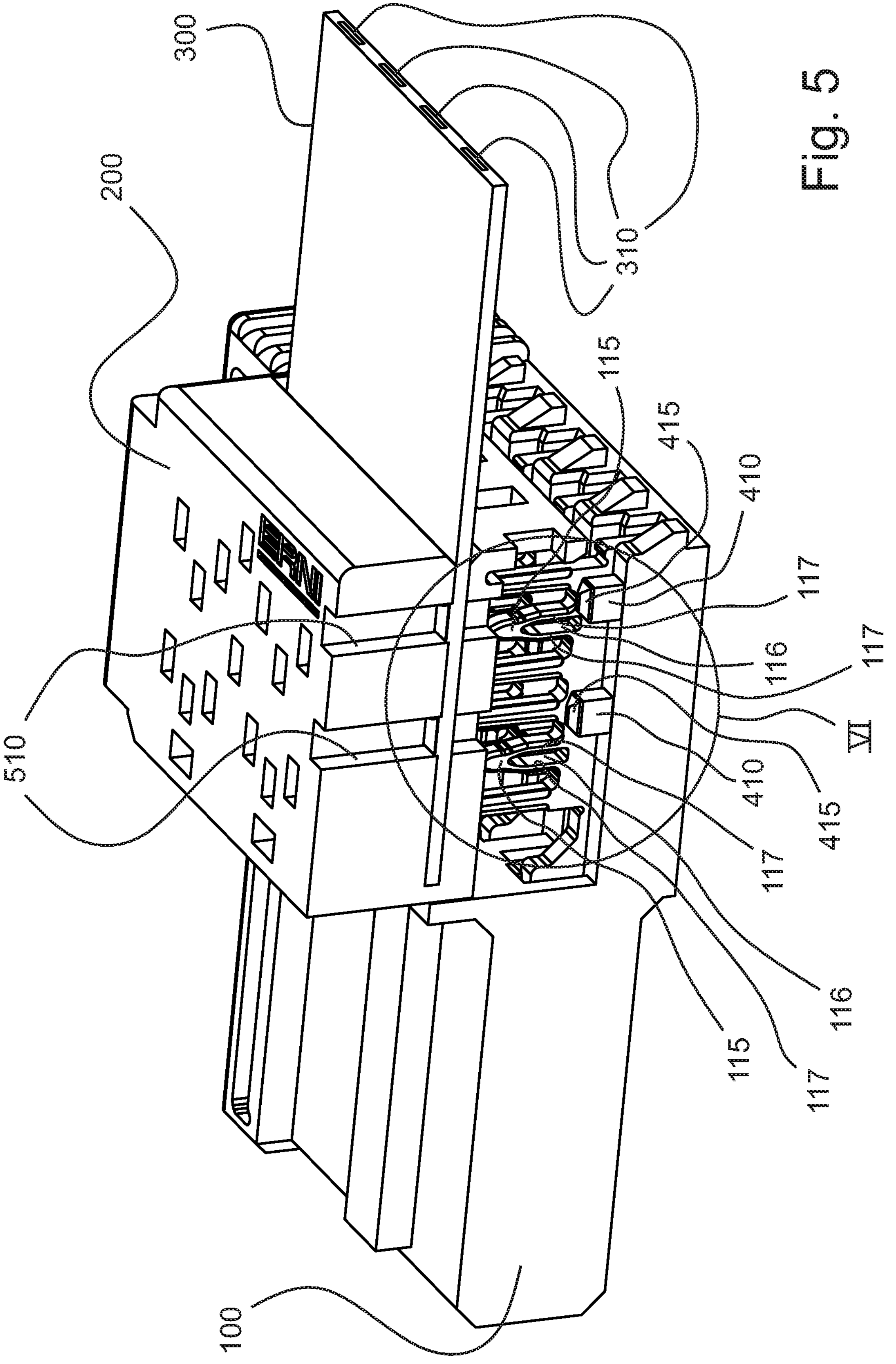
Figure 6:
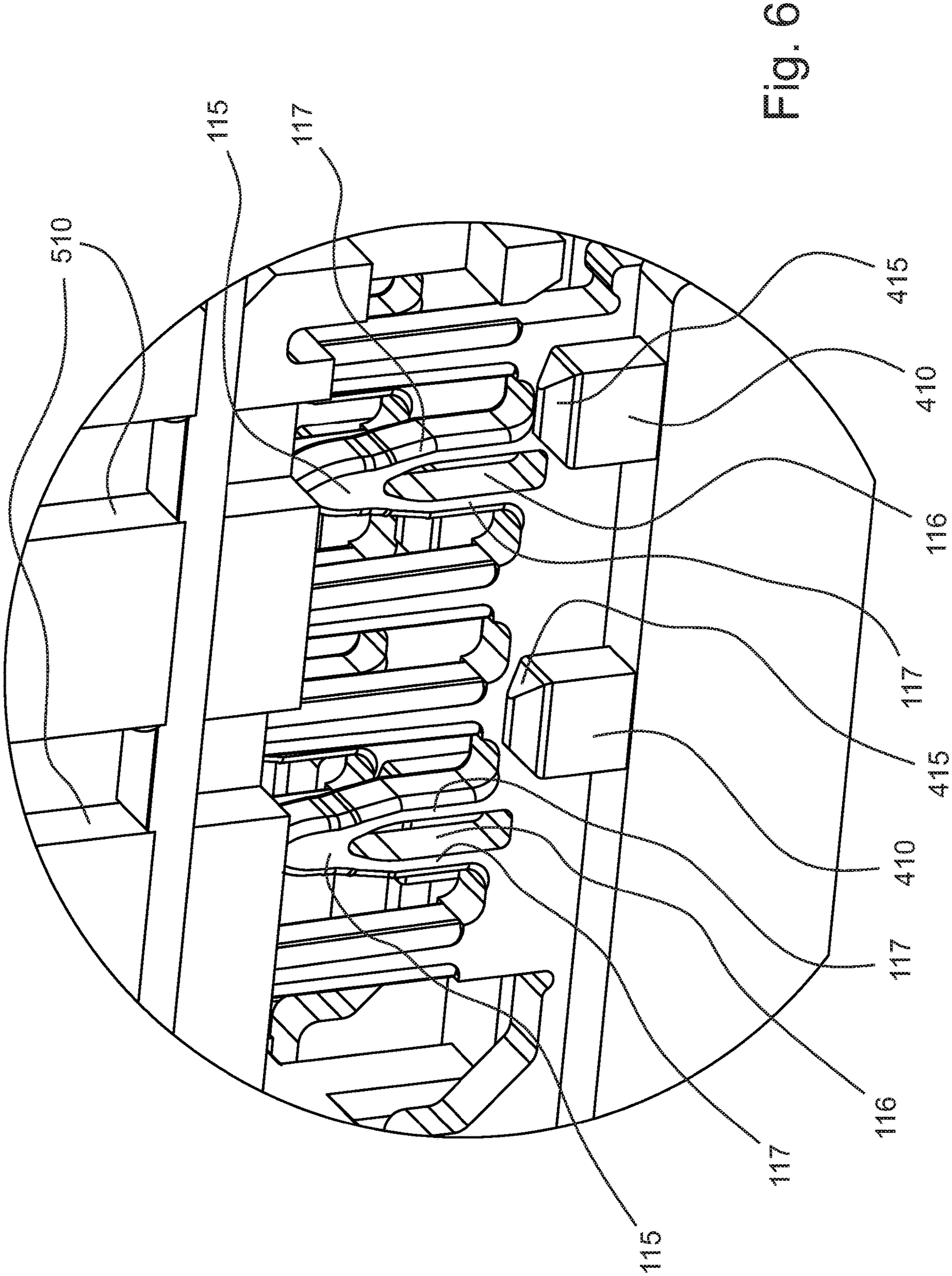

This step is schematically depicted in FIG. 5. FIG. 6 shows an enlargement of the cut-out labelled with VI in FIG. 5. In particular in this enlarged cut-out, it is depicted how the clamping teeth surfaces 415 of the clamping teeth 410 are formed tapering upwards in the manner of a roof. Of course the invention is not limited to this; rounded clamping teeth or those tapering upwards in a different manner can be also be provided. This tapering serves for the optimum clamping of the flexible conductor film 300. This clamping is schematically shown in FIG. 7 and FIG. 8, which depicts an enlargement of the cut-out labelled with VIII in FIG. 7.

Figure 7:
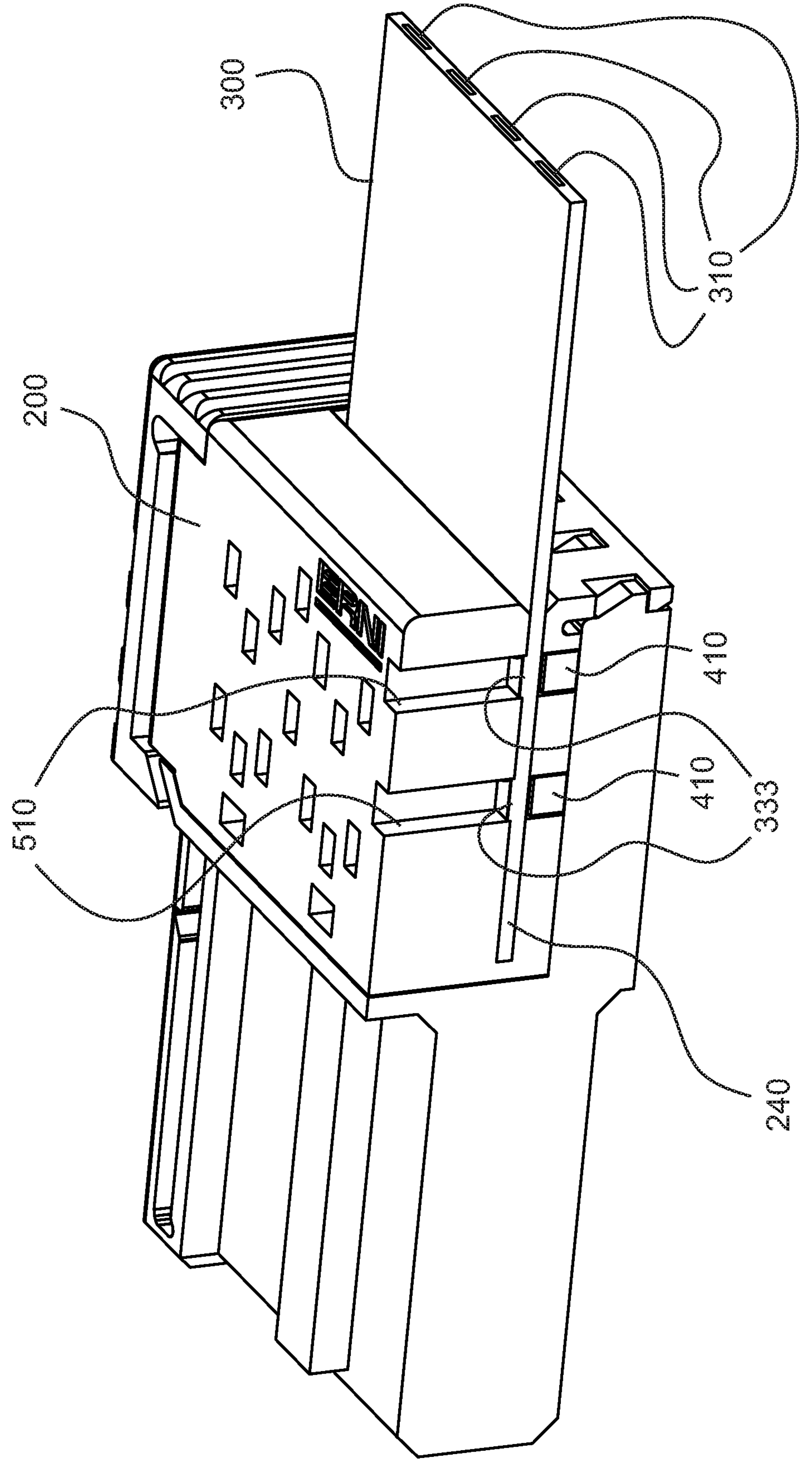
Figure 8:
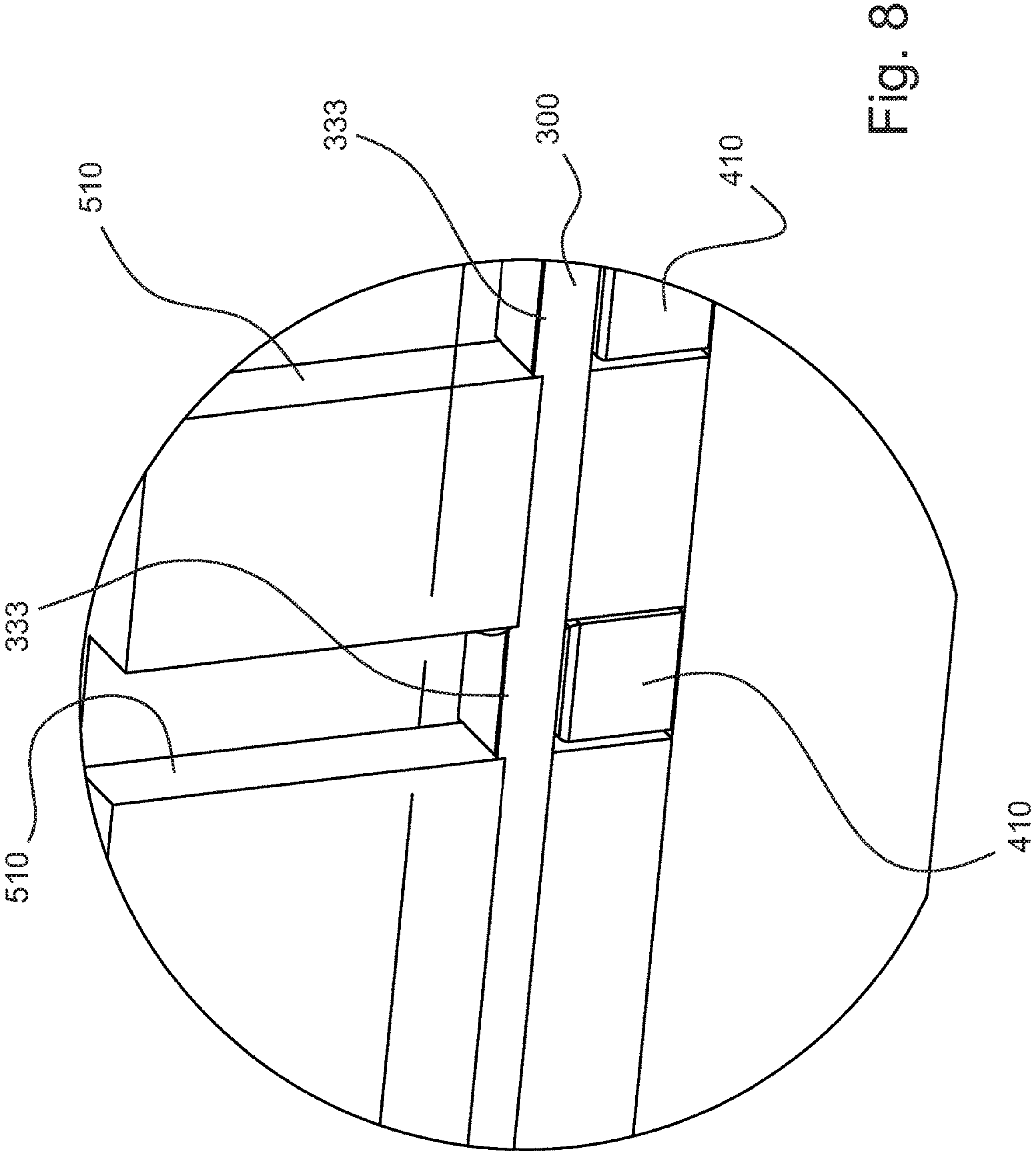

FIG. 7 shows the completely mounted plug connector with flexible conductor film 300. The isometric depiction shows how the clamping teeth 410 having their regions 415 tapering upwards marginally deform the conductor film 300, wherein the deformed regions 333 protrude somewhat into the openings 510, which are provided in the second housing part 200. To do so, the clamping teeth 410 have a height, which is measured in such a way that, in the mounted state of the two housing parts to each other, the flexible conductor film 300 arranged between the first and second housing part is deformed in such a way that the deformed regions 333 of the flexible conductor film 300 protrude slightly into the openings 510, as is depicted in FIGS. 7 and 8. This kind of clamping takes place regularly distributed over the entire conductor film 300, whereby a very stable fastening of the conductor film 300 emerges by forming a strain relief.

The plug connector eventually mounted in its complete state, i.e. without partially cut-away regions, is depicted in FIG. 9.

The interaction of the contacting by the blades 110 as well as the flexible blades 115 with the clamping by the clamping teeth 410 enables a very good, reliable, durable and stable fixing and contacting of a flexible conductor film in a plug connector with a simple mounting.

The invention claimed is:

1. A plug connector for flexible conductor films having film-insulated conductors, having a plug connector housing, in which at least one plug contact element is arranged, and having a coupling region, in which blades electrically conductively connected to the at least one plug contact element penetrate and fix at least one film-insulating conductor by producing an electrical contact, wherein the plug connector housing comprises two housing parts that can be fitted together, whose first housing part supports the blades and the at least one plug contact element electrically conductively connected to them, and whose second housing part receives and supports the flexible conductor film and has at least one blade receiver adjusted to the blades, whose boundary surfaces are formed in such a way that at least one part of the blades is bent when fitting the two housing parts together in the direction of the film-insulated conductor, wherein at least one part of the blades has a hollow space, which enables an elastic deformation of the blade edges, and wherein the blades which have a hollow space, are each arranged between the blades which are bent when fitting the two housing parts together in the direction of the film-insulated conductors.

2. The plug connector according to claim 1, wherein the hollow space has a contour adjusted to the shape of the blade.

3. The plug connector according to claim 1, wherein the second housing part has a receiving space adjusted to the conductor film, wherein two aligned openings are arranged in two opposite housing walls for receiving the conductor film.

4. The plug connector according to claim 3, wherein the two aligned openings are arranged in such a way that a conductor film arranged in the receiving space comes to rest substantially perpendicularly to the blades.

5. The plug connector according to claim 1, wherein the boundary surfaces of the blade receivers are curved.

6. The plug connector according to claim 5, wherein the boundary surfaces of the blade receivers form gliding surfaces for at least one part of the blades.

7. The plug connector according to claim 6, wherein the boundary surfaces of the blade receivers run in the manner of a funnel in such a way that two blades are bent in relation to each other, while they glide along on the boundary surfaces.

8. The plug connector according to claim 1, wherein the blades are arranged one behind the other in a line in such a way that the film-insulated conductor is cut through at several points when mounting the second housing part on the first housing part.

9. The plug connector according to claim 8, wherein the blades have different lengths, wherein in each case one shorter blade having the hollow space is surrounded by two longer blades in each case, which are spaced apart from one another in such a way and whose length is so great that they come into abutment on the boundary surfaces of a blade receiver.

10. The plug connector according to claim 1, wherein the second housing part has several blade receivers arranged one behind the other in the longitudinal direction of the film-insulated conductors.

11. The plug connector according to claim 1, wherein clamping elements are provided in the first and/or second housing part, which clamp the flexible conductor film in the mounted state of the two housing parts to one another in the region between the film-insulated conductors.

12. The plug connector according to claim 11, wherein the clamping elements are arranged between conductor tracks of the flexible conductor film.

13. The plug connector according to claim 12, wherein the clamping elements are respectively allocated to rows of blades.

14. The plug connector according to claim 11, wherein first clamping elements are arranged in the first housing part and second clamping elements interacting with the first clamping elements are arranged in the second housing part.

15. The plug connector according to claim 14, wherein the first clamping elements are clamping teeth having clamping teeth surfaces extending in the direction of the flexible conductor film, and the second clamping elements are openings adjusted to the clamping teeth and arranged in the second housing element.

16. The plug connector according to claim 15, wherein the clamping teeth have a height in such a way that, in the mounted state of the two housing parts on one another, the flexible conductor film that can be arranged between the first and the second housing part can be deformed in such a way that the deformed regions of the flexible conductor film protrude slightly into the openings arranged in the second housing part.

17. The plug connector according to claim 1, wherein the second housing part is latched with the first housing part in the mounted state.

* * * * *